United States Patent [19]
Young

[11] Patent Number: 5,159,345
[45] Date of Patent: Oct. 27, 1992

[54] TRAFFIC SPEED RADAR UNIT

[76] Inventor: Wayne K. Young, 2331 Cotters Crescent, Gloucester, Ontario, Canada, K1V 8Y7

[21] Appl. No.: 656,193

[22] Filed: Feb. 15, 1991

[51] Int. Cl.⁵ .................... G01S 13/50; G01S 7/40
[52] U.S. Cl. .................... 342/104; 342/115; 342/174
[58] Field of Search ............ 342/104, 109, 174, 115, 342/190

[56] References Cited

U.S. PATENT DOCUMENTS 4,236,140  11/1980  Aker et al. .................... 342/115

OTHER PUBLICATIONS

Skolnik, M. I., "Introduction to Radar Systems" McGrall-Hill 1980, pp. 157–158.

Primary Examiner—Gilberto Barron, Jr.
Attorney, Agent, or Firm—Kerkam, Stowell, Kondracki & Clarke

[57] ABSTRACT

An improved traffic speed radar unit, operating on the conventional doppler system, is disclosed wherein the unit includes means to verify that the internal time base frequency used to calculate vehicle speeds has not changed. Also, electronic memory is added both to facilitate an officer's work in taking notes and to allow for a more complete unit history to be maintained.

15 Claims, 5 Drawing Sheets

TRAFFIC SPEED RADAR UNIT

Traffic speed radar units have come into use by law enforcement agencies in this country and many others. There have been many advances on the original doppler radar unit, for example as described in U.S. Pat. No. 3,618,084, including a digital model such as in U.S. Pat. No. 3,689,921. The early devices have been improved such as is described in U.S. Pat. Nos. 3,859,660 and 3,950,750, and models have been devised for use in moving vehicles, such as in U.S. Pat. No. 4,335,382.

In U.S. Pat. No. 4,236,140 Aker et al, in the design of a Traffic Radar Device, provide for the use of a second crystal oscillator located within the device to which the time base can be compared. This allows the time base to be internally verified on a regular basis. The device as described fails to provide for the calibration of the time base against an external source.

The major outstanding drawback with existing police-type radar speed detectors is what is known as calibration. By this is meant the ability to be certain that when a traffic speed radar unit provides a reading, for example of the speed of a moving vehicle, the observed reading accurately indicates the actual vehicle speed. Generally, traffic speed radar units are calibrated during manufacture, and may not be adjusted thereafter.

Several factors are of particular importance in the calibration of such a unit. Generally, the unit does not measure the received radar frequency directly, but rather, mixes the transmit frequency and the received frequency and then computes the resultant frequency using a time base frequency generated within the unit. The vehicle speed observed by the user of the unit is derived from this comparison by a conventional calculative procedure. It is thus apparent that the accuracy of the observed speed is dependent on the accuracy of the time base used in the computations and the accuracy of the transmit or Gunn frequency. The time base has been commonly verified through the use of a tuning fork whereas the transmit frequency is often not checked after manufacture.

In the past, radar units were provided which required regular testing to review apparent accuracy. The testing most commonly used involved the use of a tuning fork to check the time base of the radar unit. Further, for legal purposes a law enforcement officer is often required to keep accurate notes including when the last tuning fork test was applied. This can lead to acquittals where the officer's notes are less than complete, as Courts currently accept the tuning fork test when timely applied as being reliable evidence of the accuracy of the speeds being measured. It has now been realised that reliance on the tuning fork test is misplaced.

Further, in many existing devices, the attempt is made to minimise perceived errors by adding additional error detection or error elimination circuitry: examples are to be found in U.S. Pat. Nos. 3,936,824 and 4,020,490. The usefulness of these additional circuits is open to argument; additional complications in the circuits also raises the risk of unit failure.

In order to minimize the burden on a police officer using a traffic radar device, it would be advantageous for the device to store information regarding each use. This information could include the time, the measured vehicular speed, the signal strength at each reading, and the total number of readings. Further, with the signal strength of each reading, the Courts can verify that the officer was indeed only tracking one vehicle.

This invention, therefore, seeks to provide a traffic radar unit in which verified either internally and externally or just externally, and when deemed desirable.

Further, this invention seeks to provide a unit which will store internally all of the data [accumulated] once processed and in a form suitable for evidential purposes in a readable memory. Additionally in a preferred configuration this invention seeks to provide a unit which will become inoperative if an internal error is detected which appears to affect the accuracy of the speed readings.

Thus, this invention seeks to provide a traffic radar unit including in combination:
  (i) a radar generating device adapted to provide a radar signal of known frequency, and to transmit that generated radar signal;
  (ii) a radar antenna and receiver means adapted to detect a received radar signal and to mix said received radar pulse with the generated radar signal to provide a first electronic signal;
  (iii) a time base means adapted to generate a first electronic real time clock of known frequency;
  (iv) a first computation means adapted to measure the first electronic signal frequency using the first electronic clock;
  (v) a display means which converts the measured value of the electronic signal frequency into a user visible display; and
  (vi) a second clock means.

In a further embodiment, this invention seeks to provide a traffic radar unit including in combination:
  (i) a radar generating device adapted to provide a radar signal of known frequency, and to transmit that generated radar signal;
  (ii) a radar antenna and receiver means adapted to detect a received radar signal and to mix said received radar signal with the generated radar signal to provide a first electronic signal;
  (iii) a time base means adapted to generate a first electronic clock of known frequency;
  (iv) a first computation means adapted to measure the first electronic signal frequency using the first electronic clock;
  (v) a display means which converts the measured value for the electronic signal frequency into a user visible display;
  (vi) electronic information storage means; and
  (vii) input/output means to allow information to be stored in the electronic storage means and later retrieved therefrom.

Preferably the electronic storage means comprises random access memory (RAM).

In a preferred modification, this invention also seeks to provide a traffic radar unit in which at least some, and preferably all, of the basic calibration checking information is also stored, and is therefore available for retrieval at a later time.

In a further preferred embodiment, in addition to calibration information, at least some of the information gathered during the normal use of the radar unit is also stored, such as a code to identify the user; observed speed readings for vehicles; date; time of day; and a code to identify the unit, and is therefore available for retrieval at a later time.

In a similar preferred embodiment at least some, and preferably all, of the information is stored in such a way that it may be transferred to another device for more permanent storage, combination with similar data from other similar units, for analysis, for printing, or for any other useful purpose.

In particular, the existing stored information to which the unit data is is added and with which said data is consolidated may also include the repair and maintenance history for the unit.

In a further preferred embodiment, the received doppler signal is analyzed for signal strength in order to make accurate target distance measurements possible.

This invention is applicable both to static traffic radar speed units and to moving platform units commonly referred to as "track radar."

DETAILED DESCRIPTION OF INVENTION

Figure 1A:
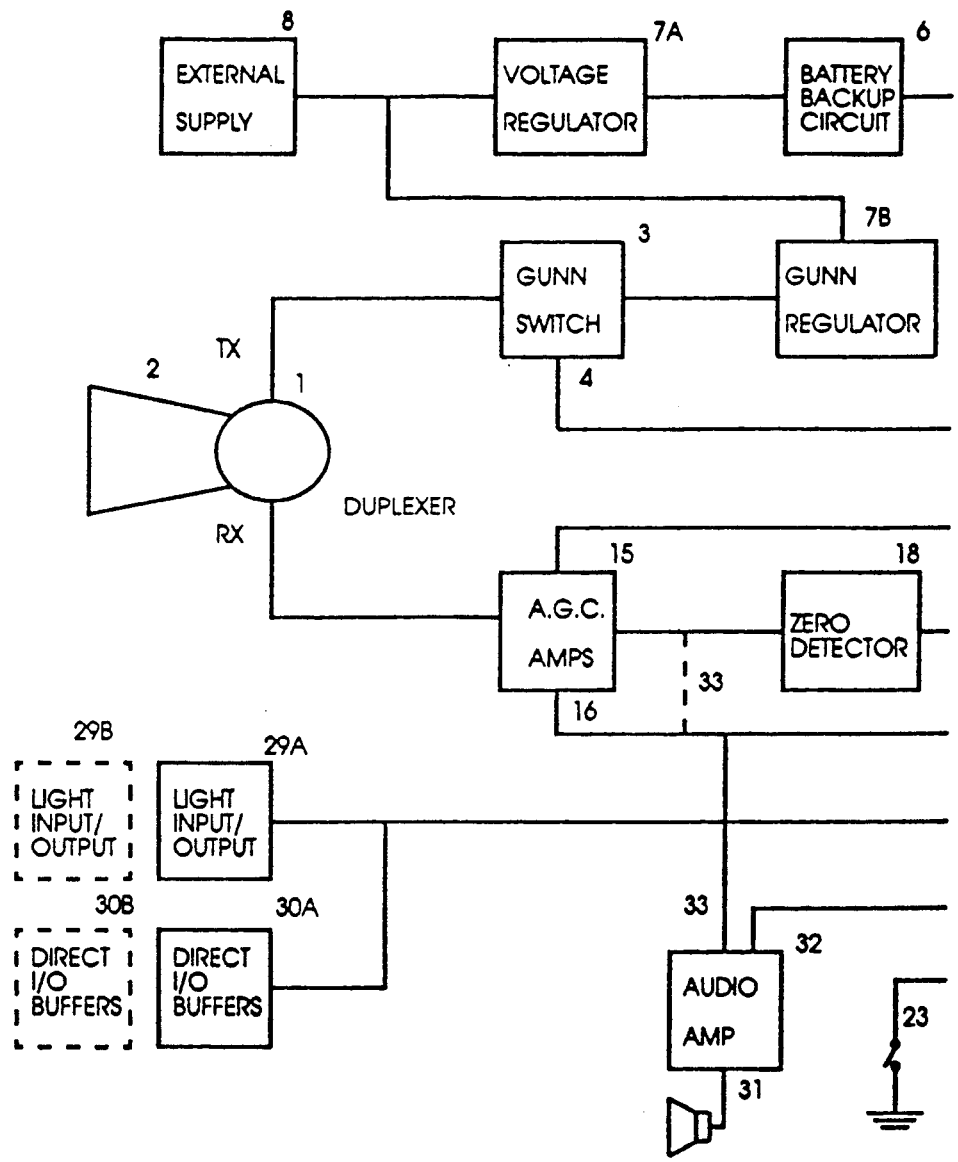
FIG. 1 is a block diagram of the of a radar unit.
Figure 1B:
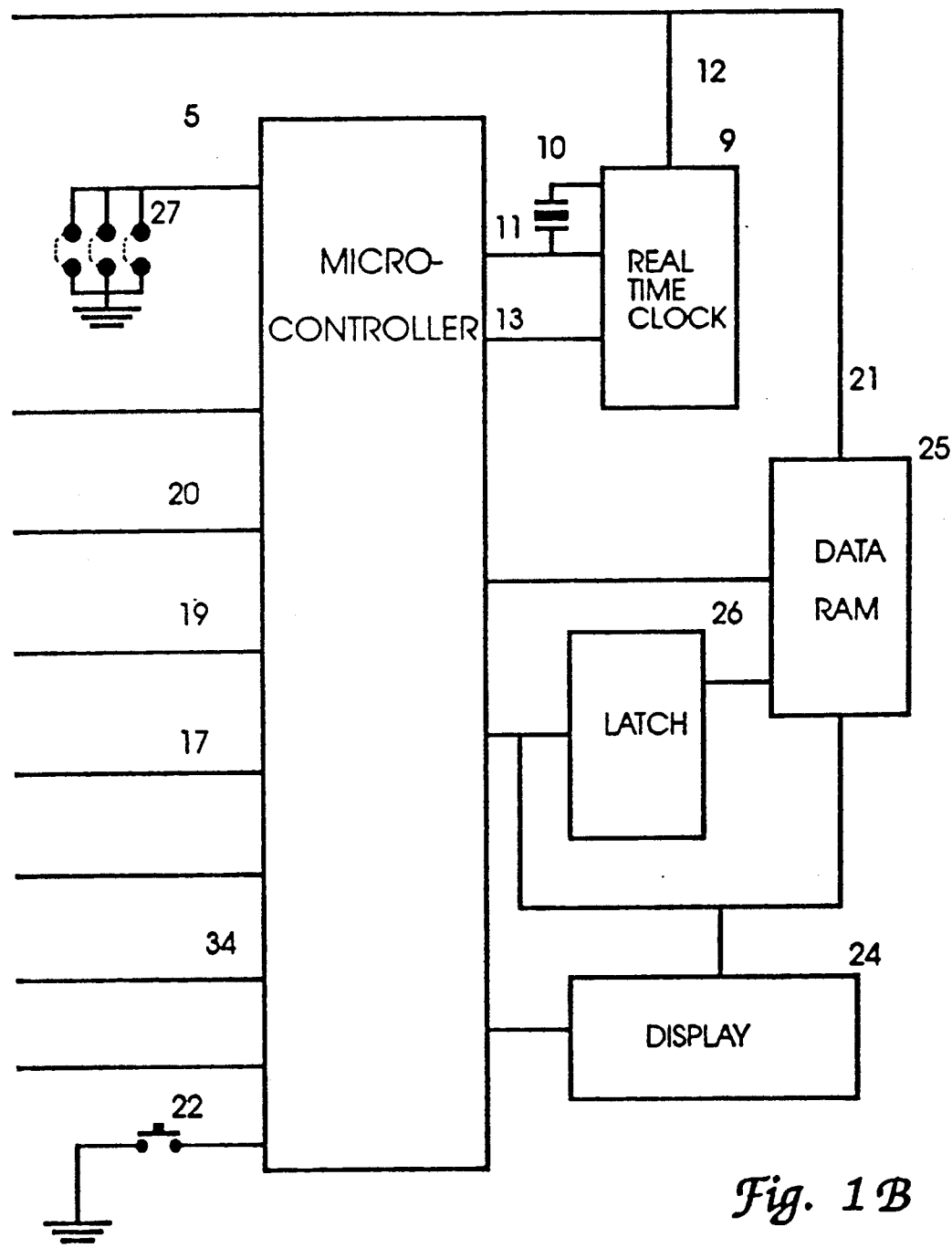

Referring now to FIG. 1, the various units which make up a traffic radar unit incorporating one embodiment of this invention are shown. The unit includes a conventional radar transmitter, 1, with a suitable antenna 2, such as a duplexer; the transmitter includes the Gunn switch, 3. The switch 3 in its turn is connected to the main microcontroller unit, 5, via power supply control lines 4. The main microcontroller includes all of the information processing requirements of the unit, and in particular will include a calculation means. In order to provide these capabilities and other features desirable for this invention, the microcontroller will have at least an on-chip program memory (ROM); a serial peripheral interface (SPI); SCI; 8-bit analog to digital converters (ADC); parallel input-output ports; and also two small memories, one a random access memory (RAM) and the other an electrically erasable programmable read only memory (EEPROM). A suitable unit is the MOTOROLA MC68HC11E9.

The unit will also include a power supply means. As shown in FIG. 1, a battery pack 6 is used. Preferably, long life batteries will be used to provide low levels of power as a backup or standby power supply. The regulator 7A which is connected, either permanently or releasably, to an external power source 8, provides the main power supply for the unit. A second regulator 7B, also connected to the power source 8, provides the main power requirements for the transmitter 1. In this configuration, the battery pack 6 is used as a back-up system which ensures that first any stored data is not lost, and second the clock time is accurate.

Various units are also connected to the microcontroller 5. For its time base to function, an electronic clock is required. A real time clock means, 9, which is driven by the quartz crystal 10 which also provides the clock for the microcontroller 5. Suitably, this crystal will oscillate at a frequency of 4.194304 MHz providing required operating clock (buffered by the real time clock means 9) in line 11 to the microcontroller 5. The real time clock means 9 also provides a real time clock which is accessible (as will be described below) by the user of the unit. As the integrity of the clock time and accuracy is quite important, the clock unit is also powered through line 12 from the battery pack 6 as well as being connected via an SPI and line 13 to the microcontroller.

An incoming radar signal is received by the duplexer 2, and is mixed with the generated radar signal within the duplexer 2. The doppler radar signal is amplified and filtered by the receiver amplifier 15. This amplifier has built in automatic gain control, so that it provides in line 16 a first electronic signal, corresponding to the doppler radar signal, in a suitable voltage range in line 17 for the analog input of the microcontroller 5. Interposed between the amplifier 15 and the microcontroller 5 is a zero crossing detector unit, 18, the output of which goes to a microcontroller timer interrupt via line 19. The timer interrupt is used to measure the period of the signal in line 19. The automatic gain control level of the amplifier 15 is fed to another analog input 20 of the microcontroller 5, and is used in a to make signal strength measurements to ensure proper tracking of target vehicles. connected to the microcontroller 5 include a power on/off switch 22, a trigger push button 23, and a display unit 24, which generally will be a conventional system including both a four character alphanumeric display and a smaller eight character alphanumeric display together with suitable drivers. Suitable units are those made by Seimens under part numbers PD4435 and PD2435.

Data processed by the microcontroller unit 5 is stored in the data random access memory 25, which is also connected via line 21 to the back-up battery 6. The latch unit 26 multiplexes the lower eight address lines and the data lines in a standard fashion.

The configuration setting for the unit is determined by the configuration jumpers 27, which will, for example, select between Kph and Mph measurement.

In a preferred embodiment of this invention the traffic unit is also configured to enable down-loading of the information in the data memory 25. There are at least two convenient ways to do this, in both of which information is retrieved from the memory 25 via SPI to the microcontroller 5 and exported via the SCI and line 28. In one option, an infrared transmitter-receiver unit 29A is used to down-load the stored data, to a matching receiver-transmitter unit (shown ghosted at 29B), in a conventional fashion. Alternatively, a hardwire plug-in connection 30B can be used, for the same purpose, through the buffer unit 30A. Generally, if both hardwire and infrared capabilities are provided, the buffers 30A will include a means whereby the infrared unit 29A is disabled when a hardwire connection 30B is made.

Conventional traffic units also generally include an audio tone output comprising a speaker 31 driven by a suitable audio amplifier 32, which utilises a tone output signal in line 33 from the receiver amplifier and operates under the control of the microcontroller 5 through line 34. In many conventional units the signal in line 16 is also used in line 33 as is indicated by the ghosted connection.

The use of the automatic gain control (AGC) level of amplifier 15 to provide a separate received doppler signal strength measurement allows for a relative distance reading for the target for which speed also is being measured. This system is advantageous over prior art which attenuated incoming signals in order to provide target range limiting. The AGC amplifies the received signal to a suitable level for the apparatus without performing any signal attenuation. This provides filterring of targets based on distance, for instance to accomodate better the different conditions of city and highway locations while retaining the original signal strength to noise ratio.

Figure 2:
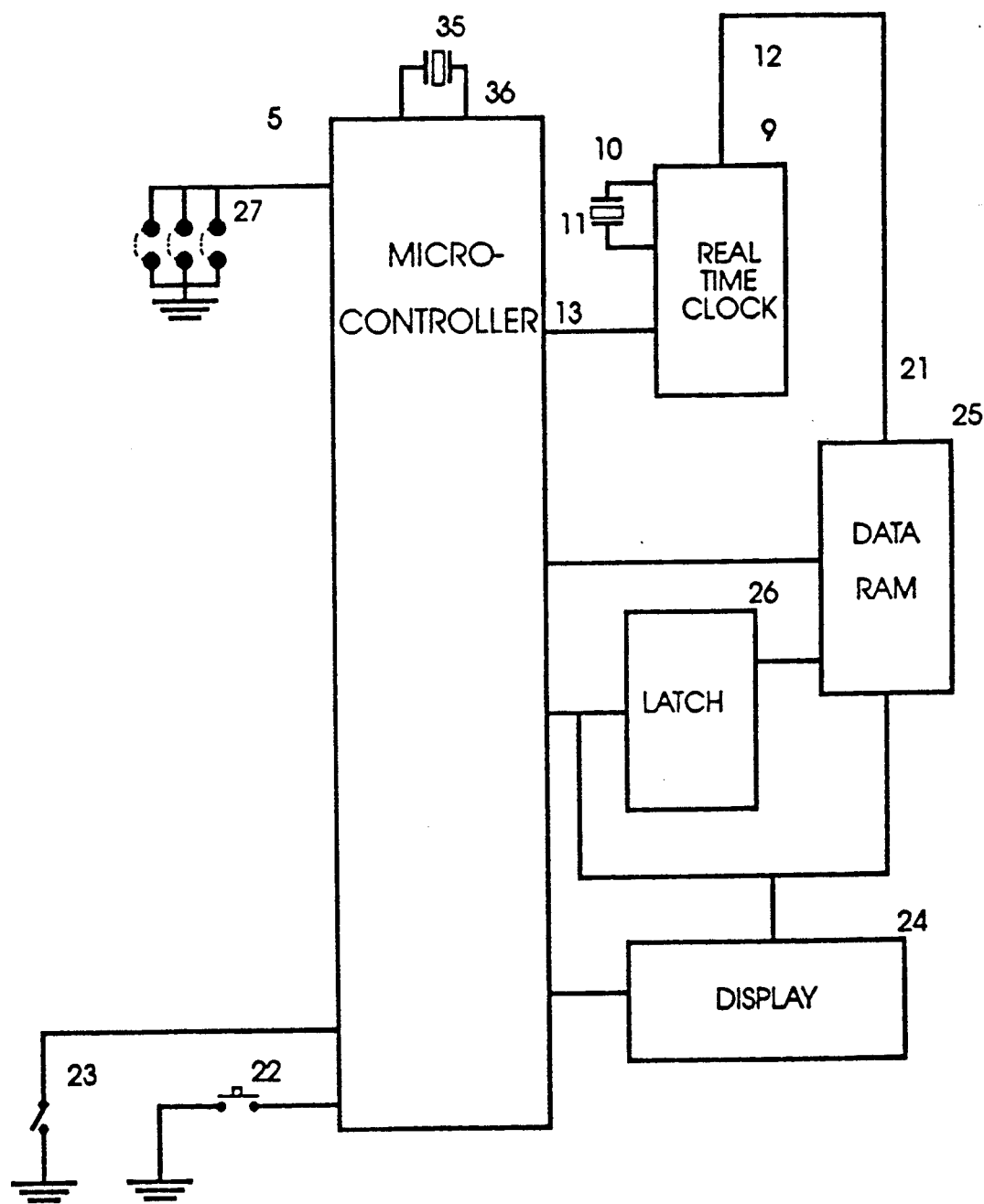
FIG. 2 is a block diagram of a modification of FIG. 1.

In FIG. 2 is shown a modification of part of FIG. 1 and represents a preferred embodiment of the invention. In this variation, a second crystal 35 provides a second electronic clock in line 36 to the microcontroller 5. Preferably the two crystals are different, for example, the real time clock can operate at a standard 32.768 Khz while the clock for the microcontroller is much faster.

As regards most of its functions the traffic unit operates in much the same way as a conventional unit, and includes in the microcontroller conventional programming for this purpose. Thus the initial switch-on sequence initiated by the power on switch 22, which conventionally will include the display of various items by the display 24 may remain the same. Similarly, the use of the unit to assess the speed of a target vehicle may remain unchanged, and will result in information being displayed by the display 24. Changes in operation result from the presence of the real time clock 9, and of crystal 35, if present, and of the memory 25. Taking the memory first, it is intended that this memory will have at least sufficient the information gathered and processed in a single period of operation, for example one of about twelve hours. Accordingly, it is desirable to add to the start-up sequence, on first switching on the traffic unit, a program which will provide a display indicating to the user how much memory space is available, for example by showing how much space has been used of the available space. Furthermore, it is also desirable for this reading to be updated as the unit is used, so that a user can be advised that further data cannot be stored, and that down-loading is needed.

The memory capability of the unit also leads to the necessity for storing and retrieving information. This can be accomplished using the power button 22 and the trigger 23 by altering their functionality during specific functions. This allows for only desired readings to be stored, and for information to be output only when desired. Alternatively, these functions could be implemented with additional push buttons or the like.

Another major functional change results from the presence of the clock or clocks. In either embodiment these will provide a signal which can be displayed indicating the actual time of day. In the FIG. 1 configuration, the time displayed will be controlled by the same crystal, 10, as provides the clock for the microcontroller time base. Therefore, if the time displayed is correct on comparison with another reliabletime source, for example the user's watch or a radio time signal, then the clock to the microcontroller is unchanged, and, therefore, the time base frequency used by the microcontroller 5 to calculate target vehicle speed also will not have changed. Consequently, a displayed speed reading can be presumed to be accurate. Alternatively, if the displayed time ceases to be correct in comparison to another time source, then by the same logic it may be inferred that displayed speed readings are no longer reliable, and unit maintenance is desirable. It is desirable that the internal real time clock 9 be checked electronically with a reference real time clock during the downloading of the stored information.

In the FIG. 2 configuration a second essentially independent crystal is provided. For similar reasons as in the FIG. 1 case, as long as comparison of the two available clocks by the microcontroller 5 shows them to be the same, then speed readings can be presumed accurate. As soon as a time difference appears then it may be inferred that reliability has been lost and that unit maintenance is desirable. When an crystal 35 is used there are several available options. The simplest option has the device verifying the internal crystal frequencies and displaying the time for external verification.

Figure 3A:
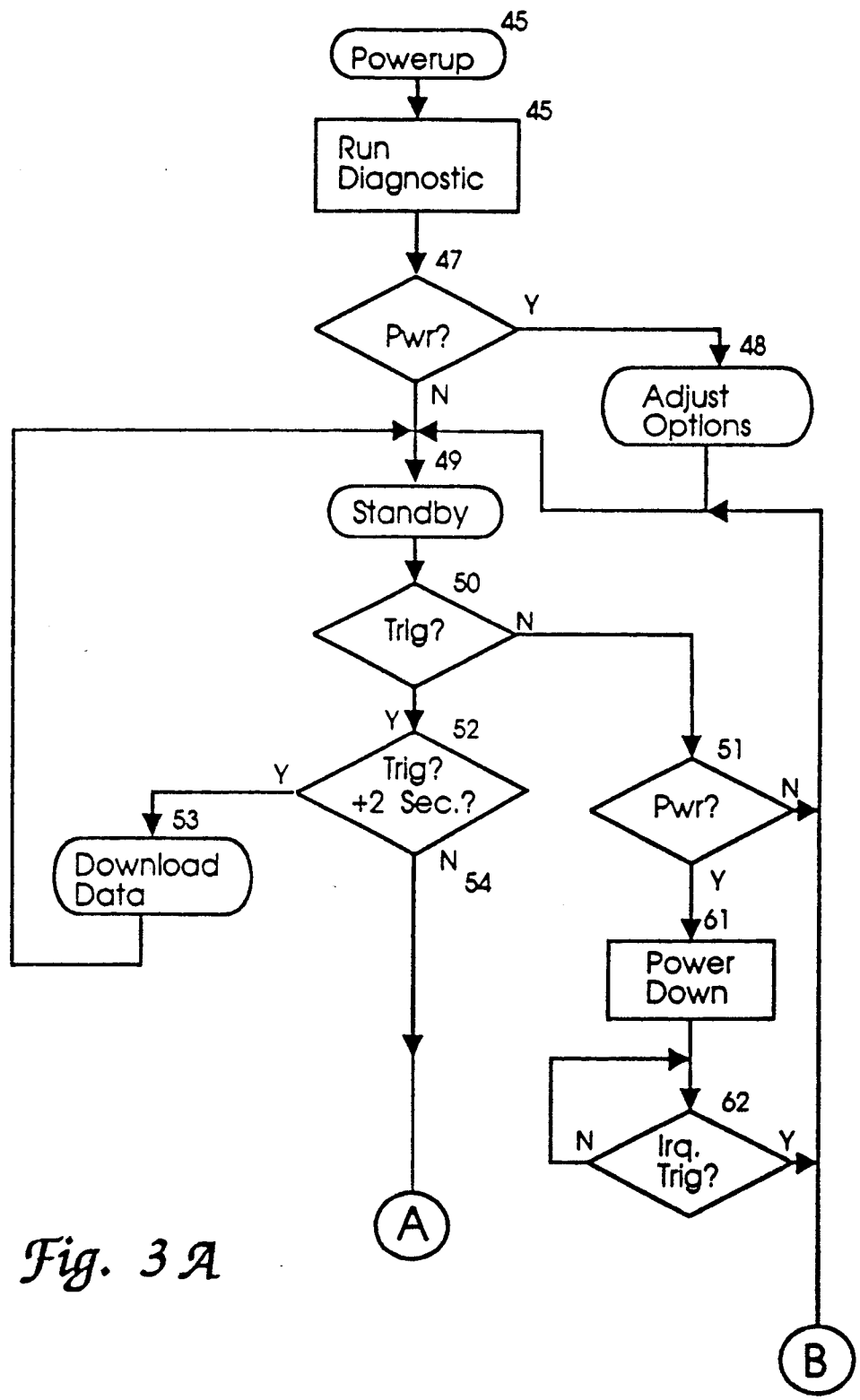
FIG. 3 is a simplified flow chart of the operation of an embodiment of a unit as shown in FIG. 1.
Figure 3B:
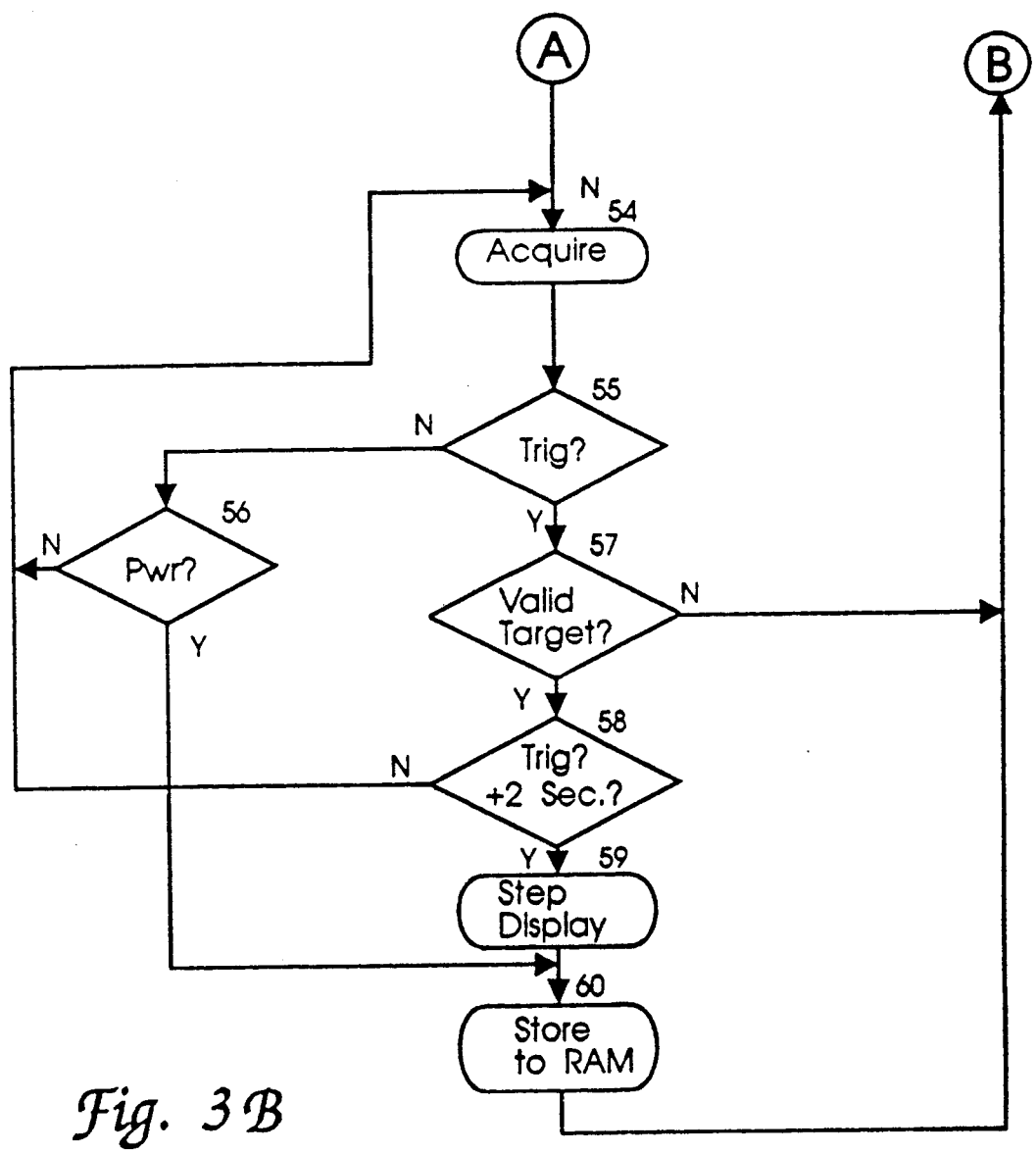

FIG. 3 represents a simplified flow chart of the algorithm in a preferred embodiment. The decision triangles labled "Trig?" will branch in the direction of the "Y" should the trigger push-button 23 be pressed, and to the direction of "N" should the trigger not be pressed. Similarly, the "Pwr?" decision triangle in reference to the power push button 22 will branch in the direction of the "Y" should the power push-button 22 be pressed, and to the direction of "N" should the power not be pressed.

Upon application of power to the unit, 45, such as by connection to a power supply available on a vehicle, the unit will perform a diagnostic, 46, on the RAM, program memory, real time clock, time base and display. Pressing the power button during power up, 47, will put the unit into a mode to adjust options, 48. In this mode limits of signal strength, and speed at which readings will be displayed to the user, are set as prompted by the display and actioned by the push buttons. At its completion, or if the power button was not pressed, the unit would go to the standby mode, 49. In this mode the transmitter is turned off. The trigger and power push buttons are then scanned for activation, 50 and 51. Upon activation of the trigger push button at this point, a decision is made based upon when the trigger button is released, 52. If the button is held for over two seconds the unit will attempt to begin down-loading the data from RAM, 53, using conventional programming procedures to ensure reliable data transfer and memory management. If a hardwire connection 30A exists, the unit will verify that it is connected to a compatible receiver and will then down-load the data from RAM 53. If no hardwire connection 30A exists the unit will check for a compatible receiver unit to its infra red output 29A (also using infra red such as at 29B). If one is found, down-loading data from RAM commences. Once complete the unit will verify that the data transfer was complete before clearing the data in RAM 25. If the button of 52 is released within the two second limit the radar will jump into the acquire mode, 54. In this mode the transmitter is turned on, the frequency of the doppler radar signal is measured, the speed is computed, the relative range is computed (from the automatic gain control level) and the information is displayed if warranted. At this point the readings are stored temporarily in the microcontroller 5, on circuit RAM in a "round robbin" fashion. After each acquisition attempt the push buttons are again scanned, 55 & 56. If the trigger push button is pressed and a valid trigger reading was just acquired, 57, the speed will be locked on the display. The unit will continue to acquire target readings as set by option jumpers 27, and then turn off the transmitter. If the last reading was not a valid target reading the unit immediately returns to standby. Assuming a valid target was locked a short press of trigger push-button 58 will put the unit back into the acquire mode. While pressing the button for more than two seconds will put the unit into a step display mode, 59. The step display mode will sequentially display the readings stored as a result of pressing the trigger push button 23. The number of readings would depend on the setting of the option jumpers 27. After exiting the step display mode the unit will automatically store all relevant readings, 60 into the data RAM 25. If it is desired to store observed target readings at 55, without first reviewing them, this may be done by pressing the power push button at 56. When it is desirable to turn off the unit without unplugging it, pressing the power push button while in standby 51, will cause the microcontroller to turn off all power supplies via control lines 4, and put the microcontroller into a power down mode, 61. In this mode total unit current draw is kept minimal. This will leave the microcontroller 5, the data RAM 25 and the real time clock 9 powered by the battery back-up 6. Pressing the trigger push button 23 will create an interrupt request 62, putting the microcontroller back into full operation in standby 49 without first running the diagnostics 46.

As is described above, the traffic speed radar unit of this invention indicates to the user that its operating frequency must be accurate if the time shown or observed is accurate. However, due to the fact that all of the generated data is stored in the electronic memory, any errors between the crystals (in the FIG. 2 embodiment) can also be stored. Since this data can be retrieved, final accuracy on a day-to-day basis is available in a format suitable for use as evidence in a court, together with the visual display information originally used as the basis for a charge. Hence, the user is relieved of the need to confirm unit accuracy, as the unit itself includes that data in a retrievable and identifiable format, which may include, for instance, data, time of day, unit code, officer code, speed reading and unit accuracy.

The embodiments of the invention in which an exclusive property or privilege is claimed are defined as follows:

1. A traffic radar unit for determining the speed of a target vehicle including in combination:
   (i) a radar signal generating means adapted to provide a radar signal of known frequency;
   (ii) a duplexer adapted to transmit the generated radar signal and to detect a received radar signal and to mix said received radar signal with the generated radar signal to provide a first electronic signal;
   (iii) a time base means adapted to generate a first electronic clock of known frequency and a user visible real time clock;
   (iv) a first computative means adapted to measure the first electronic signal with the first electronic clock and provide a computed electronic signal;
   (v) a display means which converts the computed electronic signal frequency into a user visible display including information indicative of target vehicle speed;
whereby the operator can verify the accuracy of the real time clock in order to verify the accuracy or otherwise of the displayed target vehicle speed.

2. A unit according to claim 1 further including:
   (vi) electronic information bulk storage means adapted to store at least some of the information shown by the display means; and
   (vii) input and output means to allow information to be stored in the electronic storage means and later retrieved therefrom.

3. A unit accordingly to claim 1 wherein the time base means is controlled by a quartz crystal oscillator of known frequency.

4. A unit according to claim 3 wherein the electronic information storage means includes random access memory.

5. A unit according to claim 1 further including:

(vii) automatic gain control means to amplify the first electronic signal to an appropriate level for the first computative means.

6. A unit according to claim 5 wherein the value of the automatic gain control level is used to monitor the relative target distance.

7. A traffic radar unit for determining the speed of a target vehicle including in combination:
   (i) a radar signal generating means adapted to provide a radar signal of known frequency;
   (ii) a duplexer adapted to transmit the generated radar signal and to detect a received radar signal and to mix said received radar signal with the generated radar signal to provide a first electronic signal;
   (iii) a time base means adapted to generate a first electronic clock of known frequency;
   (iv) a first computative means adapted to measure the first electronic signal with the first electronic clock and provide a computed electronic signal;
   (v) a display means which converts the computed electronic signal frequency into a user visible display including information indicative of target vehicle speed;
   (vi) electronic information bulk storage means adapted to store at least some of the information shown by the display means; and
   (vii) input and output means to allow information to be stored in the electronic storage means and retrieved therefrom;
wherein the time base means also provides a user visible real time clock whereby the operator can verify the accuracy of the real time clock in order to verify the accuracy or otherwise of the displayed information indicative of target vehicle speed.

8. A unit according to claim 7 wherein the time base means is controlled by a quartz crystal oscillator of known frequency.

9. A unit according to claim 7 further including:
   (vii) automatic gain control means to amplify the first electronic signal to an appropriate level for the first computative means,
and wherein the automatic gain control level is used to compute a value for the relative target distance.

10. A traffic radar unit for determining the speed of a target vehicle including in combination:
   (i) a radar signal generating means adapted to provide a radar signal of known frequency;
   (ii) a duplexer adapted to transmit the generated radar signal and to detect a received radar signal and to mix said received radar signal with the generated radar signal to provide a first electronic signal;
   (iii) a time base means adapted to generate a first electronic clock of known frequency;
   (iv) a first computative means adapted to measure the first electronic signal with the first electronic clock and provide a computed electronic signal;
   (v) a display means which converts the computed electronic signal frequency into a user visible display including information indicative of target vehicle speed;
   (vi) electronic information bulk storage means; and
   (vii) input and output means to allow information to be stored in the electronic storage means and retrieved therefrom;
wherein the electronic information bulk storage means is adapted to store for retrieval when desired at least some of the information shown by the display means; information concerning unit accuracy; and other information including but not limited to date, time of day, a unit code, an officer code, and other speed readings.

11. A unit according to claim 10, wherein the electronic information bulk storage means includes both random access memory, and a battery back up means.

12. A traffic radar unit for determining the speed of a target vehicle including in combination:
   (i) a radar signal generating means adapted to provide a radar signal of known frequency;
   (ii) a duplexer adapted to transmit the generated radar signal and to detect a received radar signal and to mix said received radar signal with the generated radar signal to provide a first electronic signal;
   (iii) a time base means adapted to generate a first electronic clock of known frequency;
   (iv) a first computative means adapted to measure the first electronic signal with the first electronic clock and provide a computed electronic signal;
   (v) a display means which converts the computed electronic signal frequency into a user display indicative of target vehicle speed;
   (vi) a crystal means adapted to generate a second electronic clock of known frequency and a user visible real time clock;
   (vii) a second computative means adapted to provide a second electronic signal the value of which is indicative of the similarity of the first electronic clock and the second electronic clock; and
   (viii) a display means which converts the second electronic signal into a user visible display;
whereby the operator can verify the accuracy of the real time clock in order to verify the accuracy or otherwise of the displayed target vehicle speed.

13. A traffic radar unit for determining the speed of a target vehicle including in combination:
   (i) a radar signal generating means adapted to provide a radar signal of known frequency;
   (ii) a duplexer adapted to transmit the generated radar signal and to detect a received radar signal and to mix said received radar signal with the generated radar signal to provide a first electronic signal;
   (iii) a time base means adapted to generate a first electronic clock of known frequency;
   (iv) a first computative means adapted to measure the first electronic signal with the first electronic clock and provide a computed electronic signal;
   (v) a display means which converts the computed electronic signal frequency into a user display indicative of target vehicle speed;
   (vi) electronic information bulk storage means adapted at least some of the information shown by the display means; and
   (vii) input and output means to allow information to be stored in the electronic storage means and retrieved therefrom;
   (viii) a crystal means adapted to generate a second electronic clock of known frequency and a user visible real time clock;
   (ix) a second computative means adapted to provide a second electronic signal the value of which is indicative of the similarity of the first electronic clock and second electronic clock; and
   (x) a display means which converts the second electronic signal into a user visible display;
whereby the operator can verify the accuracy of the real time clock in order to verify the accuracy or otherwise of the displayed target vehicle speed.

14. A traffic radar unit for determining the speed of a target vehicle including in combination:
   (i) a radar signal generating means adapted to provide a radar signal of known frequency;
   (ii) a duplexer adapted to transmit the generated radar signal and to detect a received radar signal and to mix said received radar signal with the generated radar signal to provide a first electronic signal;
   (iii) a time base means adapted to generate a first electronic clock of known frequency;
   (iv) a first computative means adapted to measure the first electronic signal with the first electronic clock and provide a computed electronic signal;
   (v) a display means which converts the computed electronic signal frequency into a user visible display indicative of target vehicle speed;
   (vi) a crystal means adapted to generate a second electronic clock of known frequency and a user visible real time clock;
   (vii) a second computative means adapted to provide a second electronic signal the value of which is indicative of the similarity of the first electronic clock and the second electronic clock; and
   (viii) a means which if the second electronic signal is indicative of an error, automatically shuts down the unit;
whereby, whilst the unit is in operation, the operator can verify the accuracy of the real time clock in order to verify the accuracy or otherwise of the values displayed.

15. A traffic radar unit for determining the speed of a target vehicle including in combination:
   (i) a radar signal generating means adapted to provide a radar signal of known frequency;
   (ii) a duplexer adapted to transmit the generated radar signal and to detect a received radar signal and to mix said received radar signal with the generated radar signal to provide a first electronic signal;
   (iii) a time base means adapted to generate a first electronic clock of known frequency;
   (iv) a first computative means adapted to measure the first electronic signal with the first electronic clock and provide a computed electronic signal;
   (v) a display means which converts the computed electronic signal frequency into a user visible display indicative of target vehicle speed;
   (vi) electronic information bulk storage means adapted to store at least some of the information shown by the display means;
   (vii) input and output means to allow information to be stored in the electronic storage means and retrieved therefrom;
   (viii) a crystal means adapted to generate a second electronic clock of known frequency and a user visible real time clock;
   (ix) a second computative means adapted to provide a second electronic signal the value of which is indicative of the similarity of the first electronic clock and the second electronic clock; and
   (x) a means which if the second electronic signal is indicative of an error, automatically shuts down the unit;
whereby, whilst the unit is in operation, the operator can verify the accuracy of the real time clock in order to verify the accuracy or otherwise of the values displayed.

* * * * *